United States Patent
Goda (10) Patent No.: US 9,139,108 B2
(45) Date of Patent: Sep. 22, 2015

(54) CONTROL DEVICE AND CONTROL METHOD FOR ELECTRIC POWERED VEHICLE

(75) Inventor: Hideaki Goda, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 22 days.

(21) Appl. No.: 13/882,292

(22) PCT Filed: Nov. 19, 2010

(86) PCT No.: PCT/JP2010/070682
§ 371 (c)(1),
(2), (4) Date: Apr. 29, 2013

(87) PCT Pub. No.: WO2012/066673
PCT Pub. Date: May 24, 2012

(65) Prior Publication Data
US 2013/0218393 A1    Aug. 22, 2013

(51) Int. Cl.
*B60L 11/00*    (2006.01)
*B60L 15/20*    (2006.01)
(Continued)

(52) U.S. Cl.
CPC ............ *B60L 15/2072* (2013.01); *B60L 11/123* (2013.01); *B60L 11/14* (2013.01); *B60L 15/20* (2013.01); *B60L 2210/30* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2250/26* (2013.01); *Y02T 10/6217* (2013.01); *Y02T 10/642* (2013.01);
(Continued)

(58) Field of Classification Search
CPC .......... B60K 6/365; B60K 6/445; B60K 1/02; B60K 10/06; B60K 10/08; B60K 20/00; B60K 10/115; B60K 2510/0638; B60K 2710/081; Y02T 10/6239; Y02T 10/6286; Y02T 10/642; Y02T 10/7258; B60L 2240/421; F16H 2037/0873; F16H 2061/1208; F16H 2061/1284; F16H 59/105; F16H 61/12; F16H 61/21
USPC .................. 701/29, 53, 62; 477/34, 107, 119; 475/150, 208; 180/65.1, 65.2; 60/602; 417/309; 290/40 A; 348/135; 123/179.25
See application file for complete search history.

(56) References Cited

U.S. PATENT DOCUMENTS 5,593,365 A * 1/1997 Tabata et al. .................. 477/119
6,067,798 A * 5/2000 Okada et al. .................... 60/602
(Continued)

FOREIGN PATENT DOCUMENTS

JP    H06276603 A    9/1994
JP    8-163713 A     6/1996
(Continued)

*Primary Examiner* — James Trammell
*Assistant Examiner* — Sanjeev Malhotra
(74) *Attorney, Agent, or Firm* — Kenyon & Kenyon LLP (57) ABSTRACT

In an electric powered vehicle in which vehicle driving force for reverse running is produced by a traction motor, vehicle driving force is set by a product of a base value set at least based on an accelerator opening and an amplification factor. The amplification factor is set at k1=1.0 during reverse running (V<−Vt) and at k1>1.0 at the start of reverse running (V≥0) depending on the vehicular speed. The vehicle driving force at the start of reverse running can thereby be made larger than the vehicle driving force after the start of reverse running at the same accelerator opening.

15 Claims, 5 Drawing Sheets

(51) Int. Cl.
 B60L 11/12 (2006.01)
 B60L 11/14 (2006.01)
(52) U.S. Cl.
 CPC .............. *Y02T 10/70* (2013.01); *Y02T 10/7077* (2013.01); *Y02T 10/7241* (2013.01)

(56) References Cited

U.S. PATENT DOCUMENTS

| | | | | |
|---|---|---|---|---|
| 2002/0121395 | A1* | 9/2002 | Norman et al. | 180/65.1 |
| 2003/0203790 | A1* | 10/2003 | Matsubara et al. | 477/107 |
| 2006/0060399 | A1* | 3/2006 | Tabata et al. | 180/65.2 |
| 2006/0247086 | A1* | 11/2006 | Watanabe et al. | 475/208 |
| 2007/0225889 | A1* | 9/2007 | Morris | 701/53 |
| 2008/0240941 | A1* | 10/2008 | Kumazaki et al. | 417/309 |
| 2008/0258474 | A1* | 10/2008 | Tabata et al. | 290/40 A |
| 2009/0023530 | A1* | 1/2009 | Iwase et al. | 475/150 |
| 2009/0062064 | A1* | 3/2009 | Kamada et al. | 477/34 |
| 2009/0122136 | A1* | 5/2009 | Shiraishi et al. | 348/135 |
| 2009/0198402 | A1* | 8/2009 | Quigley et al. | 701/29 |
| 2010/0145583 | A1* | 6/2010 | Kamada | 701/62 |
| 2012/0024253 | A1* | 2/2012 | Hartmann et al. | 123/179.25 |

FOREIGN PATENT DOCUMENTS

| | | |
|---|---|---|
| JP | 10-201013 A | 7/1998 |
| JP | H1182087 A | 3/1999 |
| JP | 2007-176321 A | 7/2007 |
| JP | 2008-295224 A | 12/2008 |
| JP | 2009-051366 A | 3/2009 |

* cited by examiner

CONTROL DEVICE AND CONTROL METHOD FOR ELECTRIC POWERED VEHICLE

CROSS REFERENCE TO RELATED APPLICATIONS

This is a 371 national phase application of PCT/JP2010/070682 filed 19 Nov. 2010, the contents of which are incorporated herein by reference.

FIELD OF THE INVENTION

The present invention relates to a control device and a control method for an electric powered vehicle, and more particularly relates to controlling driving force for an electric powered vehicle by which vehicle driving force for reverse running is produced by a traction motor.

BACKGROUND OF THE INVENTION

For an electric powered vehicle, such as an electric vehicle or a hybrid vehicle equipped with a traction motor, it is common to produce vehicle driving force for reverse running by a motor. For example, Japanese Laid-Open Patent Publication No. 10-201013 (PTL 1) describes, when setting output torque of a traction motor based on the amount of accelerator operation, compensating for target torque to be higher as the motor rotation speed decreases and to be lower as the motor rotation speed increases. Furthermore, it is described that, when the shift position is at a reverse position, torque is made smaller than in forward running.

Japanese Laid-Open Patent Publication No. 2008-295224 (PTL 2) describes motor control for facilitating driving at the time of reverse running in an electric vehicle. Specifically, it is described that, when the vehicular speed at the time of reverse running becomes more than or equal to the maximum speed, inverter duty control is performed so as to limit the vehicular speed.

Furthermore, Japanese Laid-Open Patent Publication No. 8-163713 (PTL 3) describes a reverse control device of an electric vehicle that restricts switching from forward to reverse depending on the vehicular speed. Specifically, it is described that, only when the vehicular speed is less than or equal to a predetermined vehicular speed, control is exerted such that the motor is reversely driven depending on the amount of operation of the accelerator pedal. Accordingly, switching to reverse can be made if there is no problem in switching from forward to reverse, while switching to reverse can be restricted if there is a problem in switching from forward to reverse.

Moreover, Japanese Laid-Open Patent Publication No. 2007-176321 (PTL 4) describes control for increasing driving torque appropriately based on the running state including a stopping state during running at low speeds, such as off-road running. Specifically, it is described that the running state in which the vehicle is at a stop while in contact with a step is determined and that a gain of driving torque is changed based on this determined running state.

CITATION LIST

Patent Literature

PTL 1: Japanese Laid-Open Patent Publication No. 10-201013

PTL 2: Japanese Laid-Open Patent Publication No. 2008-295224

PTL 3: Japanese Laid-Open Patent Publication No. 8-163713

PTL 4: Japanese Laid-Open Patent Publication No. 2007-176321

SUMMARY OF INVENTION

Technical Problem

A typical engine vehicle not equipped with a traction motor is commonly constructed such that an engine output shaft is coupled to a driving shaft via a torque converter because of the characteristic of engine that is difficult to ensure torque in a low rotation speed range. The torque converter has a characteristic that amplifies torque when the rotational speed difference between the input shaft rotation speed (engine speed) and the output shaft rotation speed is large.

Therefore, in the typical engine vehicle, in a low vehicular speed range, engine torque is amplified by the torque converter and is transmitted to the driving shaft. As a result, at the start of reverse running, relatively high driving torque can be obtained by the action of the torque converter even if the accelerator opening is small. That is, reverse running can be smoothly started without depressing the accelerator pedal to a great degree, which improves user operability.

On the other hand, since the motor can output high torque even in a low speed range, an electric powered vehicle equipped with the traction motor is commonly constructed such that output torque of the traction motor is transmitted to the driving shaft without intervention of a torque converter.

Therefore, in order to obtain high torque in an electric powered vehicle at the time of reverse running, the accelerator opening needs to be increased. As a result, the accelerator operation at the time of reverse running greatly differs from a typical engine vehicle. A user having changed from a typical engine vehicle to an electric powered vehicle may thus feel degradation in operability.

If the vehicle is at a stop with torque being output from the traction motor due to shortage of vehicle driving force at the start of reverse running, the traction motor will be brought into a lock state. When the lock state is continued, a temperature rise may occur due to current concentration on the coil winding of the traction motor and a particular phase of an inverter that controls the traction motor. If a temperature rise occurs, output torque of the traction motor is restricted, thus resulting in degraded running performance.

The present invention was made to solve such problems, and has an object, in an electric powered vehicle constructed such that vehicle driving force at the time of reverse running is produced by a traction motor, to appropriately set the vehicle driving force at the time of reverse running, thereby improving user operability.

Solution to Problem

In an aspect of the present invention, a control device for an electric powered vehicle equipped with a motor producing vehicle driving force for reverse running includes a reverse running control unit and a motor control unit. When a predetermined shift range in which the reverse running is instructed has been selected, the reverse running control unit calculates, based on a vehicular state at least including an accelerator opening, vehicle driving force for reverse running to be lower than vehicle driving force for forward running in the same vehicular state. The reverse running control unit is configured to amplify the calculated vehicle driving force such that vehicle driving force at the start of reverse running is larger than vehicle driving force during reverse running at the same accelerator opening while a brake pedal is not being operated. The motor control unit controls the motor to output torque in accordance with the vehicle driving force set by the reverse running control unit.

In another aspect of the present invention, a control method for an electric powered vehicle equipped with a motor producing vehicle driving force for reverse running includes the steps of, when a predetermined shift range in which the reverse running is instructed has been selected, calculating, based on a vehicular state at least including an accelerator opening, vehicle driving force for reverse running to be lower than vehicle driving force for forward running in the same vehicular state, amplifying the vehicle driving force calculated such that vehicle driving force at the start of reverse running is larger than vehicle driving force during reverse running at the same accelerator opening while a brake pedal is not being operated, and controlling the motor to output torque in accordance with amplified vehicle driving force.

Preferably, the start of the reverse running includes a state where the predetermined shift range has been selected and a vehicular speed of the electric powered vehicle is zero, and during the reverse running, the electric powered vehicle is in a state where the vehicular speed is lower than a negative predetermined value (−Vt). More preferably, the start of the reverse running further includes a state where the predetermined shift range has been selected and the vehicular speed of the electric powered vehicle is higher than zero.

Still more preferably, an amplification factor (k1) of vehicle driving force at the start of the reverse running relative to the vehicle driving force during the reverse running at the same accelerator opening is set to be variable depending on the accelerator opening.

Alternatively preferably, the amplification factor (k1) is set at a first value when the accelerator opening falls within a first range (α1–α2). On the other hand, the amplification factor is set to be lower than the first value when the accelerator opening is smaller than the first range and the amplification factor is set to be lower than the first value when the accelerator opening is larger than the first range.

Preferably, during the reverse running, the electric powered vehicle is in a state where the vehicular speed is lower than the negative predetermined value (−Vt). At the start of the reverse running, the vehicular speed is higher than or equal to zero. When the vehicular speed is lower than zero and higher than the predetermined value, the vehicle driving force at the same accelerator opening is amplified to be smaller than the vehicle driving force at the start of the reverse running and larger than the vehicle driving force during the reverse running.

More preferably, a reference angular velocity (ωt) of the motor is further calculated based on the accelerator opening and the vehicular speed of the electric powered vehicle. When a rotation angular velocity (ω2) of the motor is lower than the reference angular velocity, the vehicle driving force is set to be larger than when the rotation angular velocity (ω2) of the motor is higher than the reference angular velocity.

Preferably, the electric powered vehicle is configured such that the torque produced by the motor is transmitted to a driving wheel without intervention of a torque converter.

Advantageous Effects of Invention

According to the present invention, in an electric powered vehicle constructed such that vehicle driving force at the time of reverse running is produced by a traction motor, user operability can be improved by appropriately setting the vehicle driving force at the time of reverse running.

DESCRIPTION OF EMBODIMENTS

Embodiments of the present invention will be described below in detail with reference to the drawings. It is noted that the same or corresponding portions in the drawings have the same reference characters allotted, and description thereof will not be repeated basically.

First Embodiment

Figure 1:
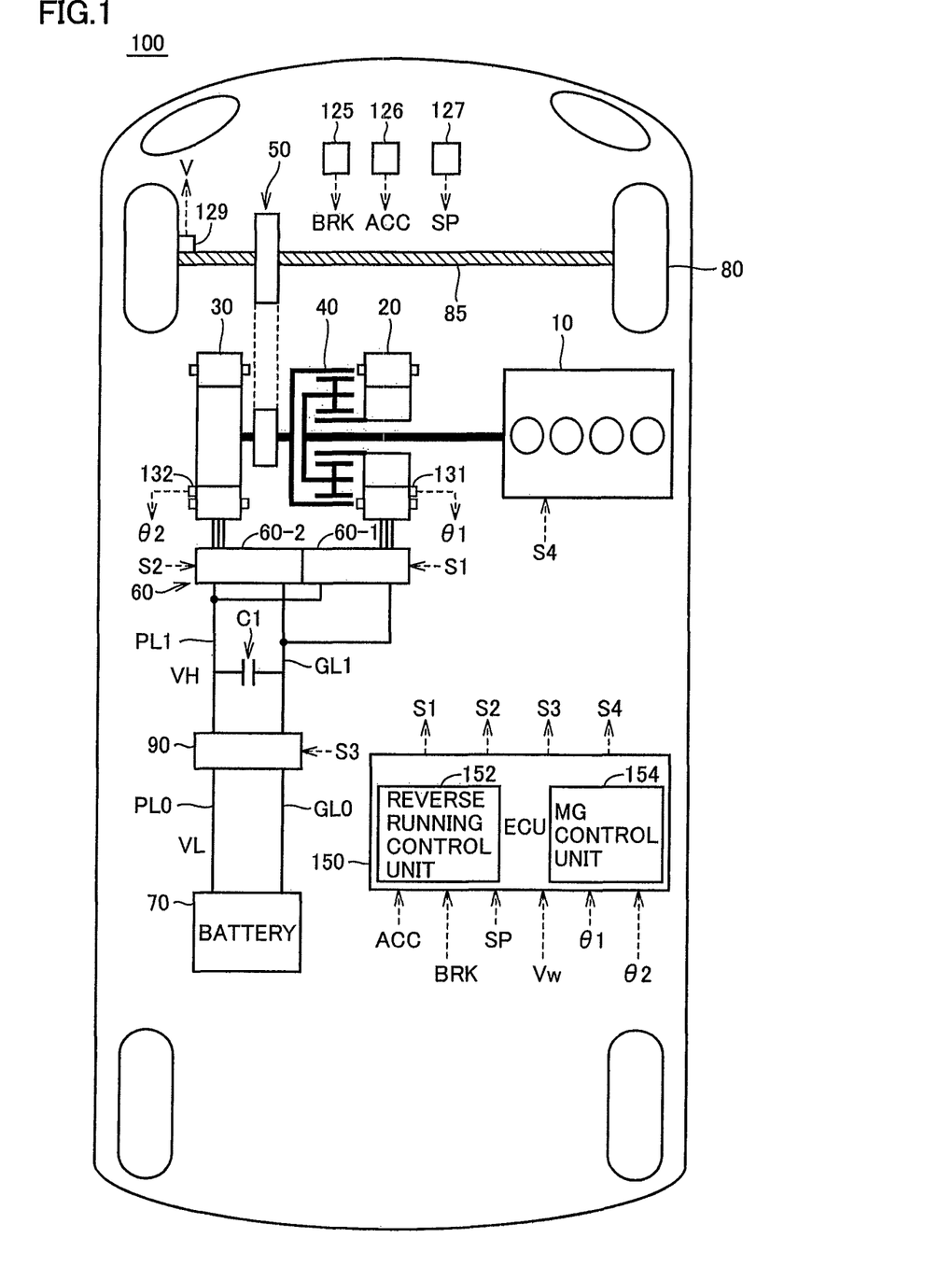
FIG. 1 is a block diagram showing a schematic configuration of a hybrid vehicle shown as a representative example of an electric powered vehicle according to a first embodiment of the present invention.

FIG. 1 is a block diagram showing a schematic configuration of a hybrid vehicle shown as a representative example of an electric powered vehicle according to a first embodiment of the present invention. It is noted that the electric powered vehicle to which the present invention is applied is a representative of vehicles equipped with a traction motor for producing vehicle driving force. That is, it is described for confirmation that the electric powered vehicle includes an electric vehicle and a fuel cell vehicle not equipped with an engine, and the like, besides a hybrid vehicle that produces vehicle driving force by the engine and the motor.

Referring to FIG. 1, a hybrid vehicle 100 includes an engine 10, a first MG (Motor Generator) 20, a second MG 30, a power split device 40, a reduction gear 50, a driving wheel 80, and a driving shaft 85. Hybrid vehicle 100 also includes an inverter 60, a battery 70, a smoothing capacitor C1, a converter 90, and an electronic control unit (hereinafter called "ECU") 150.

Engine 10 is an internal combustion engine that produces driving force for rotating a crankshaft by combustion energy produced when an air-fuel mixture of air and fuel taken into a combustion chamber is burnt. Engine 10 is controlled based on a control signal S4 from ECU 150.

First MG 20 and second MG 30 are AC motors, and are three-phase AC synchronous motors, for example.

Hybrid vehicle 100 runs with driving force output from at least one of engine 10 and second MG 30. The driving force produced by engine 10 is split into two paths by power split device 40. More specifically, one is a path leading to driving shaft 85 and driving wheel 80 via reduction gear 50, and the other one is a path leading to first MG 20.

Power split device 40 is composed of a planetary gear including a sun gear, a pinion gear, a carrier, and a ring gear.

The pinion gear is engaged with the sun gear and the ring gear. The carrier supports the pinion gear rotatably, and is coupled to the crankshaft of engine 10. The sun gear is coupled to the rotation shaft of first MG 20. The ring gear is coupled to the rotation shaft of second MG 30 and reduction gear 50.

First MG 20 operates as a power generator using motive power of engine 10 transmitted via power split device 40. Electric power generated by first MG 20 is supplied to second MG 20 via inverter 60, and is used as electric power for driving second MG 20. Of the electric power generated by first MG 20, excess power which is not used as electric power for driving second MG 20 is supplied to battery 70 via converter 90, and is used as electric power for charging battery 70. The amount of power generated by first MG 20 is controlled depending on SOC (State of Charge) of battery 70.

Second MG 30 produces driving force using at least one of electric power stored in battery 70 and electric power generated by first MG 20. Then, the driving force of second MG 30 is transmitted to driving shaft 85 and driving wheel 80 via reduction gear 50. It is noted that although FIG. 1 shows driving wheel 80 as a front wheel, a rear wheel may be driven by second MG 30 instead of or together with the front wheel.

It is noted that, at the time of braking of hybrid vehicle 100, for example, second MG 30 is driven by driving wheel 80 via reduction gear 50 and driving shaft 85, and second MG 30 operates as a power generator. Accordingly, second MG 30 also serves as a regeneration brake that converts vehicular kinetic energy into electric power. Electric power generated by second MG 30 is stored in battery 70.

Inverter 60 includes a first inverter 60-1 and a second inverter 60-2. First inverter 60-1 and second inverter 60-2 are connected to converter 90 in parallel to each other.

First inverter 60-1 is provided between converter 90 and first MG 20. First inverter 60-1 controls the output of first MG 20 based on a control signal S1 from ECU 150. Second inverter 60-2 is provided between converter 90 and second MG 30. Second inverter 60-2 controls the output of second MG 30 based on a control signal S2 from ECU 150.

For controlling first MG 20 and second MG 30, PWM (Pulse Width Modulation) control by inverters 60-1 and 60-2 is used, for example. It is noted that, since a well-known common technique may be used as a method for controlling the motor by the PWM control by the inverters, detailed description thereof will not be repeated.

Battery 70 is representatively implemented by a DC secondary battery such as a nickel-metal hydride or lithium ion secondary battery. Charging power and discharging power of battery 70 are controlled so as not to exceed rechargeable power Win and dischargeable power Wout set by ECU 150.

Converter 90 makes voltage conversions between battery 70 and inverter 60. Converter 90 boosts a voltage Vb of battery 70 (more exactly, a DC voltage VL across a positive electrode line PL0 and a negative electrode line GL0 for exchanging electric power between converter 90 and battery 70) for output to inverter 60. Converter 90 controls an output voltage of converter 90 (more exactly, a DC voltage VH across a positive electrode line PL1 and a negative electrode line GL1 for exchanging electric power between converter 90 and inverter 60) based on a control signal S3 from ECU 150. Accordingly, the output of battery 70 will also be controlled based on control signal S3.

Smoothing capacitor C1 is connected across positive electrode line PL1 and negative electrode line GL1. Smoothing capacitor C1 stores electric charges depending on voltage VH, thereby smoothing voltage VH.

Hybrid vehicle 100 further includes a brake pedal sensor 125, an accelerator pedal sensor 126, a shift position sensor 127, a vehicular speed sensor 129, and rotation angle sensors 131, 132. These sensors each transmit a detection result to ECU 150.

Brake pedal sensor 125 detects the amount of stroke BRK of a brake pedal (not shown) by a user. Accelerator pedal sensor 126 detects an accelerator opening ACC as a result of a user operation of an accelerator pedal (not shown). Vehicular speed sensor 129 detects a vehicular speed V of hybrid vehicle 100 based on the rotation speed of driving wheel 80 or driving shaft 85.

Rotation angle sensor 131 detects a rotor rotation angle θ1 of first MG 20. Rotation angle sensor 132 detects a rotor rotation angle θ2 of second MG 30. Rotation angle sensors 131, 132 are each representatively implemented by a resolver. Based on rotor rotation angles θ1 and θ2, the rotation speed (rpm) and rotation angular velocity (rad/s) of first MG 20 and second MG 30 can be calculated. Furthermore, it is also possible to obtain the vehicular speed of hybrid vehicle 100 from the rotation speed of second MG 30 and the gear ratio of reduction gear 50.

Shift position sensor 127 detects a shift position SP selected by a user operation of a shift lever (not shown). Shift positions that can be selected by the user includes a neutral position (N position), a parking position (P position) selected at the time of parking, a drive position (D position) selected at the time of forward running, and an R position selected at the time of reverse running. When the R position is selected, the shift range is brought into the R range. When the R range is selected, hybrid vehicle 100 is controlled to produce vehicle driving force for reverse running.

ECU 150 is configured to include a CPU (Central Processing Unit) and a memory, neither shown, and is configured to execute an arithmetic operation based on values detected by the respective sensors by software processing in accordance with a map and a program stored in the memory. Alternatively, at least a part of ECU may be configured to execute a predetermined numeric arithmetic operation and/or a logic operation by hardware processing performed by a dedicated electronic circuit, for example. ECU 150 generates control signals S1 to S4 mentioned above based on information from the respective sensors, for example, and outputs generated control signals S1 to S4 to the respective devices.

In hybrid vehicle 100, running control for performing running suitable for the vehicular state is executed by ECU 150. For example, at the start of vehicle and at the time of low speed running, hybrid vehicle 100 runs with the output of second MG 30 while engine 10 is stopped. At the time of steady running, hybrid vehicle 100 starts up engine 10 and runs with the outputs of engine 10 and second MG 30. In particular, by operating engine 10 at a highly efficient operating point, fuel efficiency of hybrid vehicle 100 is improved.

In electric powered vehicles including hybrid vehicle 100, vehicle driving force in a low vehicular speed range can be output by second MG 30, which eliminates the need to provide a torque converter for torque amplification. In hybrid vehicle 100, torque produced by second MG 30 and engine 10 is therefore transmitted to driving shaft 85 and driving wheel 80 without intervention of a torque converter.

Figure 2:
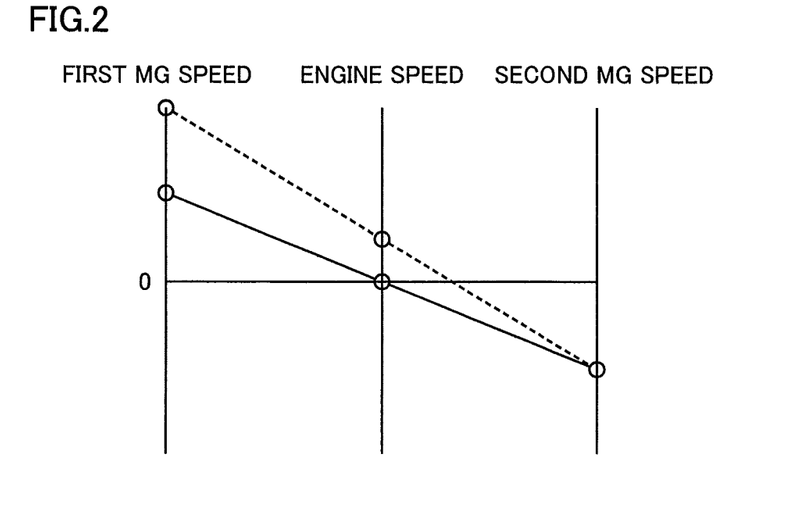
FIG. 2 is a nomographic chart taken at the time of reverse running of the hybrid vehicle shown in FIG. 1.

Referring to FIG. 2, at the time of reverse running, hybrid vehicle 100 produces vehicle driving force by rotating second MG 30 in the negative direction while engine 10 is stopped. That is, second MG 30 outputs torque in the negative direction.

It is noted that, as indicated by the dotted line in FIG. 2, engine 10 is started up when battery 70 is reduced in SOC. In this case, first MG 20 generates electric power with the output of engine 10, so that charging power of battery 70 is generated. In any case, in hybrid vehicle 100, vehicle driving force at the time of reverse running is output by second MG 30. Driving force (torque) produced by second MG 30 is transmitted to driving shaft 85 and driving wheel 80 without intervention of a torque converter as described above.

Running control for appropriately setting vehicle driving force at the time of reverse running (i.e., output torque of second MG) in electric powered vehicles including hybrid vehicle 100 will be described below.

As a functional block for this running control, ECU 150 includes a reverse running control unit 152 for setting vehicle driving force for reverse running and an MG control unit 154 for controlling second MG 30 so as to output torque in accordance with the vehicle driving force set by reverse running control unit 152. The respective functions of reverse running control unit 152 and MG control unit 154 are implemented by software processing and/or hardware processing by ECU 150.

Figure 3:
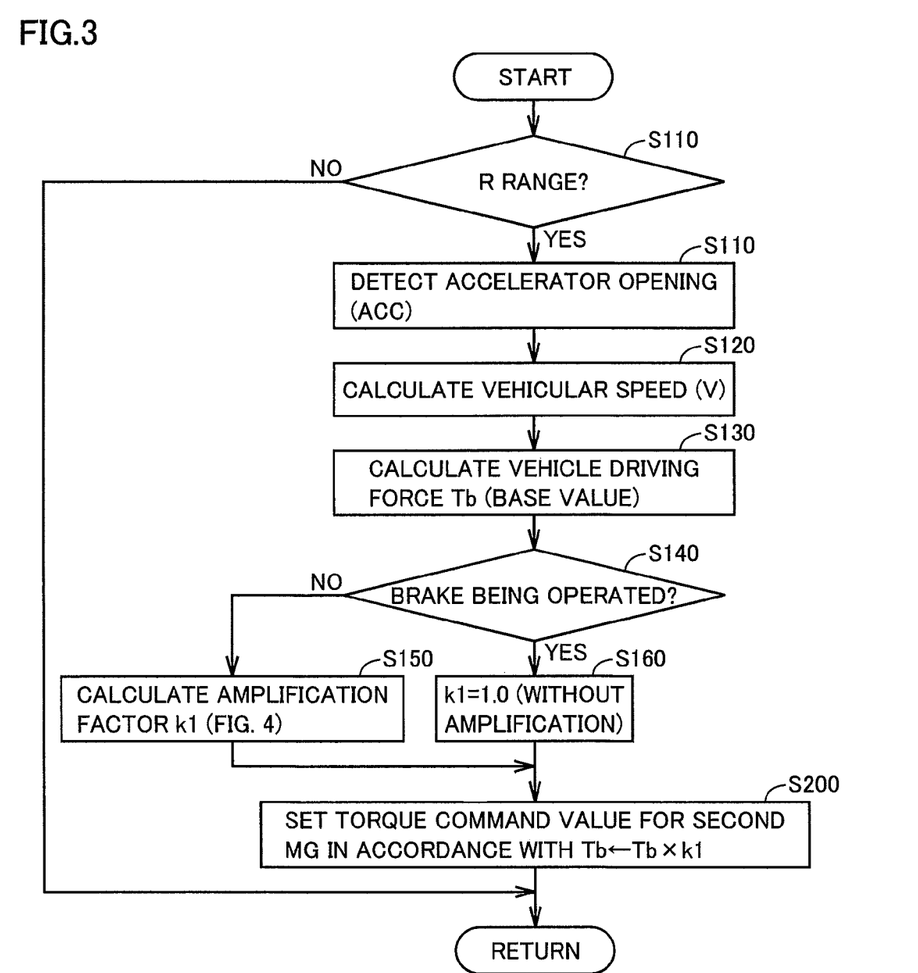
FIG. 3 is a flowchart illustrating running control of the electric powered vehicle according to the first embodiment of the present invention.

FIG. 3 is a flowchart illustrating running control of the electric powered vehicle according to the first embodiment of the present invention. The respective steps of the flowchart shown in FIG. 3 are executed by software and/or hardware processing by ECU 150. Control processing in accordance with the flowchart shown in FIG. 3 is executed by ECU 150 for every predetermined control period.

Referring to in FIG. 3, ECU 150 in step S100 determines whether the R range has been selected. When the R range has not been selected (NO determination in S110), the processing is terminated without executing each of the following steps.

When the R range has been selected (YES determination in S110), ECU 150 in step S110 detects accelerator opening ACC. Accelerator opening ACC is detected based on an output signal of accelerator pedal sensor 126.

ECU 150 in step S120 calculates vehicular speed V of hybrid vehicle 100. Vehicular speed V can be typically achieved based on an output signal of vehicular speed sensor 129. Alternatively, vehicular speed V may be detected based on the rotation speed of second MG 30 calculated from rotor rotation angle θ2 detected by rotation angle sensor 132.

Furthermore, ECU 150 in step S130 calculates a base value of vehicle driving force Tb for reverse running based on the vehicular state at least including accelerator opening ACC. The base value is calculated based on the vehicular state in the present control period in accordance with predetermined correspondence relationship between the vehicular state and vehicle driving force Tb (map or arithmetic expression). In the present specification, the following description will be made assuming that vehicle driving force Tb set when the R range has been selected has a positive value in the reverse direction. That is, driving force for reverse running increases as vehicle driving force Tb increases.

It is noted that, at the time of forward running, vehicle driving force of hybrid vehicle 100 is also determined based on the vehicular state. Vehicle driving force Tb (base value) at the time of reverse running is set to be smaller than at the time of forward running in the same vehicular state. This can prevent the vehicular speed from becoming excessively high at the time of reverse running.

ECU 150 in step S140 determines whether or not the brake is being operated. The determination in step S140 can be executed based on an output signal of brake pedal sensor 125.

ECU 150 in step S160 sets an amplification factor k1=1.0 while the brake is being operated (YES determination in S140). That is, ECU 150 sets vehicle driving force Tb without amplifying the base value calculated in step S130.

On the other hand, ECU 150 advances the processing to step S150 while the brake is not being operated (NO determination in S140), and sets amplification factor k1. Amplification factor k1 is set to be variable (k1>1.0) at least in accordance with vehicular speed V.

Then, ECU 150 in step S200 sets vehicle driving force in the reverse direction in accordance with the product of the vehicle driving force obtained in step S130 and amplification factor k1. Then, ECU 150 sets a torque command value for second MG 30 in accordance with this vehicle driving force. At the time of reverse running, the torque command value is set at a negative value in accordance with vehicle driving force Tb (Tb>0) such that second MG 30 produces torque in the negative rotation direction.

The function of reverse running control unit 152 shown in FIG. 1 is achieved by the processing of steps S110 to S200 of FIG. 3. Then, as a part of processing of step S200, MG control unit 154 controls output torque of second MG 30 in accordance with the set torque command value. For example, MG control unit 154 produces control signal S2 for controlling switching of inverter 60-2 in accordance with PWM control by current feedback of second MG 30.

Setting of amplification factor k1 will be described in detail using FIGS. 4 and 5.

Figure 4:
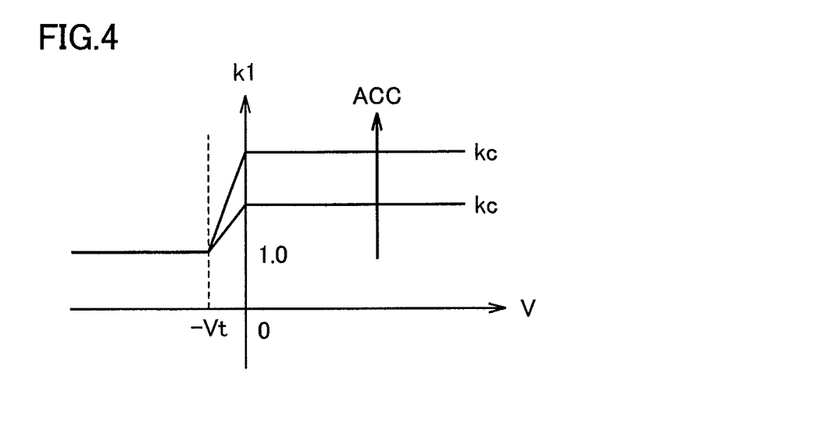
FIG. 4 is a conceptual view illustrating the relationship between the amplification factor of vehicle driving force at the time of reverse running and the vehicular speed.

FIG. 4 is a conceptual view illustrating the relationship between the amplification factor of vehicle driving force at the time of reverse running and the vehicular speed.

Referring to FIG. 4, amplification factor k1 is set in accordance with the correspondence relationship (representatively, a map) previously set depending on vehicular speed V for every accelerator opening ACC. Specifically, in a range of vehicular speed V<−Vt, which means that the vehicle is reversely running, k1=1.0 is set. For example, approximately −Vt=−2 (km/s) is set. In contrast, at the time of vehicular speed V=0 taken at the start of reverse running, k1=kc (kc>1.0) is set.

Accordingly, at the start of reverse running, vehicle driving force in the reverse direction can be set by amplification factor k1 to be larger than a value (base value) depending on accelerator opening ACC made by a user operation so as to imitate a torque amplifying effect exerted by a torque converter.

On the other hand, after the vehicle has started moving (i.e., during reverse running), k1=1.0 is set, so that vehicle driving force in the reverse direction can be set at the base value depending on a user operation (accelerator opening ACC). Therefore, the vehicular speed for reverse running can be prevented from becoming excessively higher than a user's intention.

In a middle range of −Vt<V<0, amplification factor k1 is set to fall within a range of 1.0<k1<kc so as to gradually decrease from kc toward 1.0. Therefore, in this range, the vehicle driving force becomes larger than in reverse running and smaller than at the start of reverse running at the same accelerator opening ACC.

By the above-described setting of amplification factor k1, a characteristic equivalent to the torque amplifying effect exerted by a torque converter in a typical engine vehicle can be reflected in setting of vehicle driving force at the same accelerator opening ACC.

Furthermore, in the range of vehicular speed V>0, amplification factor k1=kc is also set similarly to the case of vehicular speed V=0 (at the time of start). That is, in running control according to the present embodiment, in the case where the R range has been selected and when vehicular speed V>0 holds, as well as when vehicular speed V=0 holds, it is also regarded as "the start of reverse running", since the vehicle has not yet traveled in the reverse direction.

Accordingly, the vehicle driving force in the reverse direction can also be set to be larger than the base value corresponding to a user operation (accelerator opening ACC) when the vehicle is advancing (V>0) even though the R range has been selected, such as when going uphill by reverse running or when the vehicle cannot ride over a step height by reverse running. As a result, even if a user's accelerator operation is insufficient, the vehicle can be prevented from traveling in a direction opposite to the user's intention.

Figure 5:
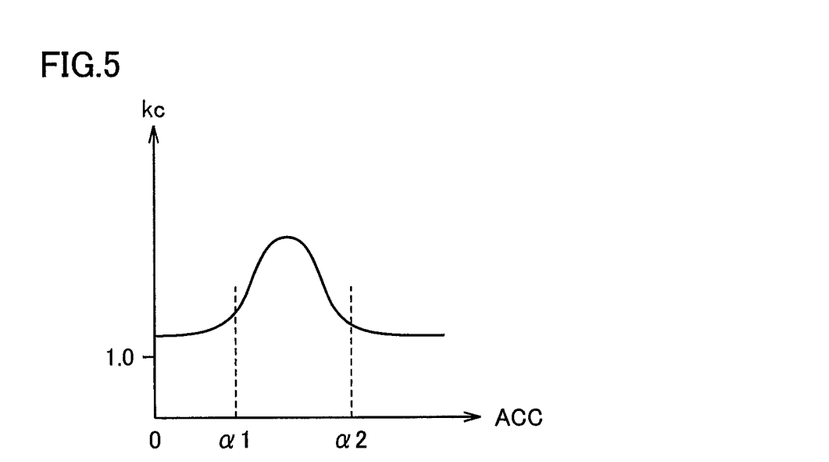
FIG. 5 is a conceptual view illustrating the relationship between the accelerator opening and the amplification factor (at the start of reverse running).

The value of amplification factor k1 (kc) when vehicular speed V≥0 holds (at the start of reverse running) is preferably set to be variable depending on accelerator opening ACC, as shown in FIG. 5.

Referring to FIG. 5, in a middle opening range ($\alpha 1 < ACC < \alpha 2$) of accelerator opening ACC, kc is set to be higher than in a small opening range ($ACC < \alpha 1$) and a large opening range ($ACC > \alpha 2$). For example, a range from $\alpha 1$ to $\alpha 2$ is a range where the accelerator opening is approximately 20 to 40 (%).

In the small opening range ($ACC < \alpha 1$), it is presumed that the user intends to suppress the reverse speed. In the large opening range ($ACC > \alpha 2$), vehicle driving force Tb is set to be large by the processing in step S130 (FIG. 4) based on accelerator opening ACC. Therefore, in these accelerator opening ranges, the necessity to amplify vehicle driving force from the base value is not very great. Therefore, kc is set to be relatively low.

On the other hand, in the middle opening range ($\alpha 1 < ACC < \alpha 2$) where it is presumed that the user intends normal reverse running, vehicle driving force can be amplified from a value depending on accelerator opening ACC, similarly to the torque amplifying effect exerted by a torque converter.

In this way, according to the running control of an electric powered vehicle according to the present first embodiment, the base value of vehicle driving force Tb calculated based on the vehicular state at least including the accelerator opening can be amplified depending on the vehicular speed. In particular, the amplification degree (amplification factor k1) is set depending on the vehicular speed so as to imitate the torque amplifying effect exerted by a torque converter usually mounted on an engine vehicle. Accordingly, sufficient vehicle driving force can be produced at the start of reverse running by an accelerator operation similar to that in a typical engine vehicle.

As a result, a user having changed from a typical engine vehicle to the electric powered vehicle does not feel degradation in operability. Furthermore, by producing sufficient vehicle driving force at the start of reverse running, it is possible to avoid bringing second MG 30 into the lock state. Moreover, when reverse running is started, amplification is interrupted (k1=1.0), so that the vehicular speed can be prevented from becoming excessively larger than a user's intention.

As described above, by appropriately setting vehicle driving force at the time of reverse running, user operability can be improved, and it is also possible to prevent beforehand the occurrence of temperature rise and accompanying output limitation.

Second Embodiment

The second embodiment will address running control including processing of amplifying vehicle driving force based on the rotation angular velocity of second MG 30, in addition to the running control of an electric powered vehicle according to the first embodiment. It is noted that, in the second embodiment, portions in common to the first embodiment will not be described without particularly making reference thereto.

Figure 6:
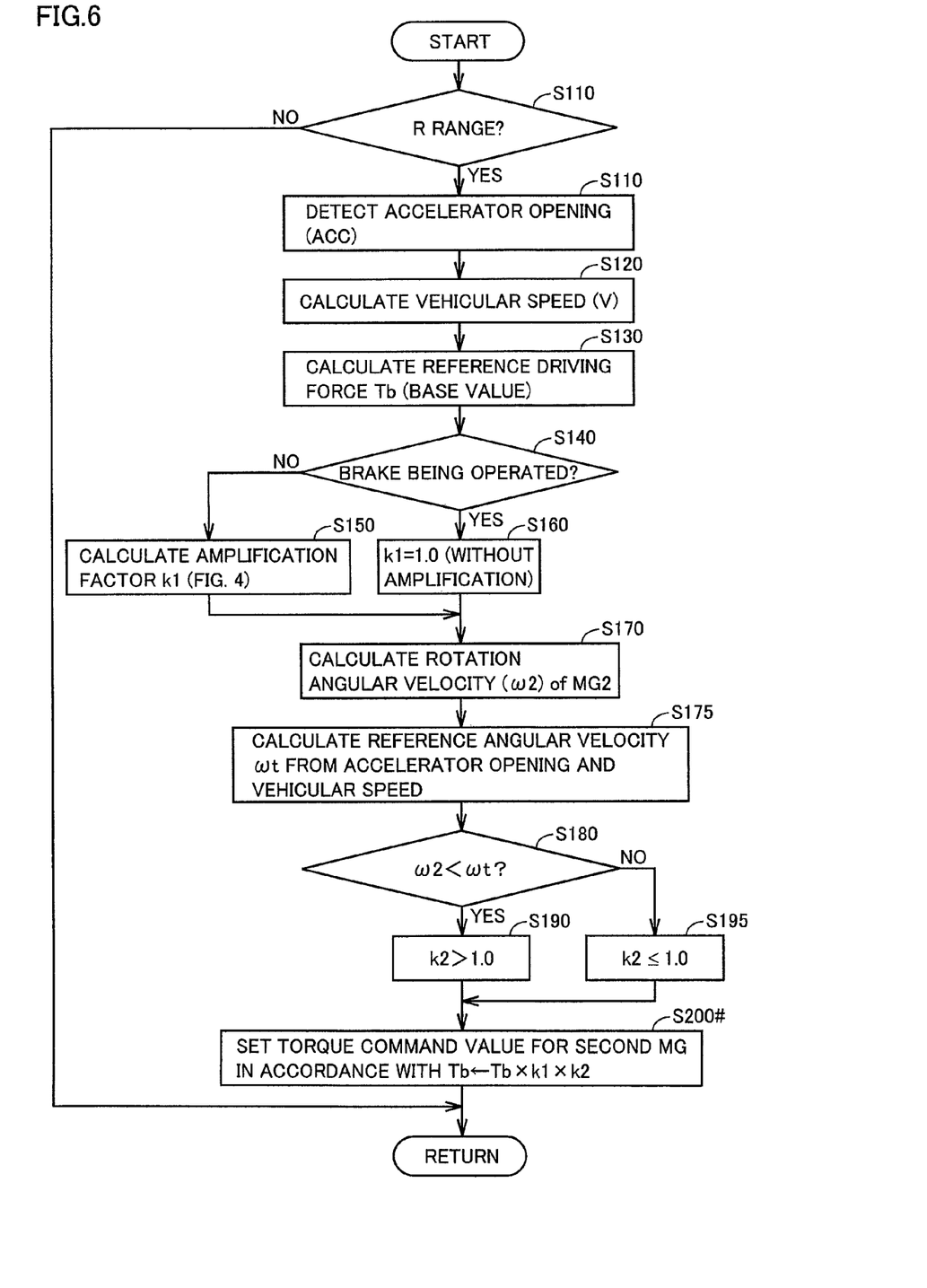
FIG. 6 is a flowchart illustrating running control of an electric powered vehicle according to a second embodiment of the present invention.

FIG. 6 is a flowchart illustrating running control of an electric powered vehicle according to the second embodiment of the present invention.

Referring to FIG. 6, in running control of an electric powered vehicle according to the second embodiment, ECU 150 sets the base value of vehicle driving force Tb for reverse running and amplification factor k1 in steps S110 to S160 similar to those of FIG. 3.

Furthermore, ECU 150 further sets an amplification factor k2 based on the rotation angular velocity of second MG 30 in steps S170 to S195. Then, ECU 150 finally in step S200# sets vehicle driving force in the reverse direction in accordance with the product of the base value of vehicle driving force Tb (step S130), amplification factor k1 and amplification factor k2. Then, ECU 150 sets a torque command value for second MG 30 in accordance with this vehicle driving force.

ECU 150 in step S170 calculates a rotation angular velocity $\omega 2$ of second MG 30. Rotation angular velocity $\omega 2$ can be calculated based on an output signal θ2 of rotation angle sensor 132 provided for second MG 30. When second MG 30 is rotated in the negative direction for reverse running, rotation angular velocity $\omega 2$ will be a negative value ($\omega < 0$).

In the vehicular state where the vehicular speed for reverse running is likely to be increased, such as when going downhill by reverse running, rotation angular velocity $\omega 2$ becomes higher. On the other hand, when going uphill or riding over an obstacle by reverse running, rotation angular velocity $\omega 2$ becomes lower.

When rotation angular velocity $\omega 2$ is low, it is preferable to increase vehicle driving force for reverse running. On the other hand, in the state where rotation angular velocity $\omega 2$ is high, the vehicular speed may become higher than a user's intention when the vehicle driving force for reverse running is amplified.

ECU 150 in step S175 calculates a reference angular velocity $\omega t$ of second MG 30 from accelerator opening ACC and vehicular speed V.

ECU 150 in step S180 compares rotation angular velocity $\omega 2$ and reference angular velocity $\omega t$. When $\omega 2 < \omega t$ holds (YES determination in S180), ECU 150 advances the processing to step S190, and sets amplification factor k2>1.0 to increase vehicle driving force Tb. It is noted that the value of k2 at this time is preferably set to be larger as the difference between rotation angular velocity $\omega 2$ and reference angular velocity cot increases.

On the other hand, when $\omega 2 > \omega t$ holds (NO determination in S180), ECU 150 in step S195 sets amplification factor k2≥1.0. By setting k2=1.0, vehicle driving force Tb equivalent to that in running control according to the first embodiment is set. It is noted that, when the difference between rotation angular velocity $\omega 2$ and reference angular velocity $\omega t$ is large, k2<1.0 may be set in order to suppress amplification of vehicle driving force Tb.

In this way, reference angular velocity $\omega t$ is a threshold value for determining whether or not the current vehicular state (accelerator opening ACC and vehicular speed V) is in a situation where vehicle driving force Tb needs to be amplified, based on rotation angular velocity $\omega 2$ of second MG 30. For example, reference angular velocity cot can be set previously based on an experimental value obtained in the state of reverse running on a flat road without any obstacle.

As described above, by the running control of an electric powered vehicle according to the second embodiment, it can be determined whether vehicle driving force needs to be amplified based on the rotation angular velocity calculated based on the output of the highly accurate rotation angle sensor attached to second MG. Accordingly, a situation that necessitates torque amplification can be detected properly, and vehicle driving force Tb can be increased by amplification factor k2. As a result, user operability is improved further, so that smooth reverse running can be achieved.

It is noted that the electric powered vehicle to which the first and second embodiments are applied is not limited to hybrid vehicle 100 shown in FIG. 1. Besides a hybrid vehicle, the present invention is applicable in common to general electric powered vehicles including an electric vehicle, a fuel cell vehicle and the like not equipped with an engine only if they have a configuration in which vehicle driving force at the time of reverse running is produced by the traction motor, irrespective of the number of provided traction motors (motor generators) and the configuration of a driving system. It is described for confirmation that, in particular, the configuration of a hybrid vehicle is not limited to the illustration of FIG. 1, but the present application is applicable to any configurations including a parallel-type hybrid vehicle only if they have a configuration in which vehicle driving force at the time of reverse running is produced by the traction motor.

It should be understood that the embodiments disclosed herein are illustrative and non-restrictive in every respect. The scope of the present invention is defined by the claims not by the description above, and is intended to include any modification within the meaning and scope equivalent to the terms of the claims.

INDUSTRIAL APPLICABILITY

The present invention is applicable to an electric powered vehicle, such as a hybrid vehicle, an electric vehicle and a fuel cell vehicle, in which vehicle driving force for reverse running is produced by a traction motor.

REFERENCE SIGNS LIST 10 engine; 40 power split device; 50 reduction gear; 60, 60-1, 60-2 inverter; 70 battery; 80 driving wheel; 85 driving shaft; 90 converter; 100 hybrid vehicle; 125 brake pedal sensor; 126 accelerator pedal sensor; 127 shift position sensor; 129 vehicular speed sensor; 131, 132, rotational angle sensor; 150 ECU; 152 reverse running control unit; 154 MG control unit; ACC accelerator opening; BRK amount of stroke of brake pedal; C1 smoothing capacitor; GL0, GL1 negative electrode line; PL0, PL1 positive electrode line; S1 to S4 control signal; SP shift position; Tb vehicle driving force (reverse running); V vehicular speed; VH, VL, Vb voltage; k1, k2 amplification factor (vehicle driving force Tb).

The invention claimed is:

1. A control device for an electric powered vehicle equipped with a motor producing vehicle driving force for reverse running, comprising:
   a reverse running control unit, when a predetermined shift range in which said reverse running is instructed has been selected, configured to calculate, based on a vehicular state at least including an accelerator opening, vehicle driving force for reverse running
      to be lower than vehicle driving force for forward running in the same vehicular state and
      to amplify the calculated vehicle driving force such that vehicle driving force at the start of reverse running is larger than vehicle driving force during reverse running at the same accelerator opening while a brake pedal is not being operated; and
   a motor control unit for controlling said motor to output torque in accordance with the vehicle driving force set by said reverse running control unit.

2. The control device for an electric powered vehicle according to claim 1, wherein
   the start of said reverse running includes a state where said predetermined shift range has been selected and a vehicular velocity of said electric powered vehicle is zero, and
   during said reverse running, said electric powered vehicle is in a state where the vehicular velocity is lower than a negative predetermined value.

3. The control device for an electric powered vehicle according to claim 2, wherein the start of said reverse running further includes a state where said predetermined shift range has been selected and the vehicular velocity of said electric powered vehicle is higher than zero.

4. The control device of an electric powered vehicle according to claim 1, wherein said reverse running control unit sets an amplification factor of vehicle driving force at the start of said reverse running relative to the vehicle driving force during said reverse running at the same accelerator opening to be variable depending on said accelerator opening while said brake pedal is not being operated.

5. The control device for an electric powered vehicle according to claim 4, wherein said reverse running control unit sets said amplification factor at a first value when said accelerator opening falls within a first range, and sets said amplification factor to be lower than the first value when said accelerator opening is smaller than said first range and sets said amplification factor to be lower than the first value when said accelerator opening is larger than said first range.

6. The control device for an electric powered vehicle according to claim 1, wherein
   during said reverse running, said electric powered vehicle is in a state where a vehicular velocity is lower than a predetermined value that is lower than zero,
   at the start of said reverse running, said vehicular velocity is higher than or equal to zero, and
   when said vehicular velocity is lower than zero and higher than said predetermined value, said reverse running control unit amplifies said vehicle driving force at the same accelerator opening to be smaller than the vehicle driving force at the start of said reverse running and larger than the vehicle driving force during said reverse running.

7. The control device for an electric powered vehicle according to claim 1, wherein said reverse running control unit calculates a reference angular velocity of said motor based on said accelerator opening and a vehicular velocity of said electric powered vehicle, and when a rotation angular velocity of said motor is lower than said reference angular velocity, sets said vehicle driving force (Tb) to be larger than when the rotation angular velocity of said motor is higher than said reference angular velocity.

8. The control device for an electric powered vehicle according to claim 1, wherein said electric powered vehicle is configured such that the torque produced by said motor is transmitted to a driving wheel without intervention of a torque converter.

9. A control method for an electric powered vehicle equipped with a motor producing vehicle driving force for reverse running, comprising the steps of:
   when a predetermined shift range in which said reverse running is instructed has been selected, calculating, based on a vehicular state at least including an accelerator opening, vehicle driving force for reverse running to be lower than vehicle driving force for forward running in the same vehicular state;

amplifying the calculated vehicle driving force such that vehicle driving force at the start of reverse running is larger than vehicle driving force during reverse running at the same accelerator opening while a brake pedal is not being operated; and controlling said motor to output torque in accordance with amplified vehicle driving force.

10. The control method for an electric powered vehicle according to claim 9, wherein the start of said reverse running includes a state where said predetermined shift range has been selected and a vehicular velocity of said electric powered vehicle is zero, and during said reverse running, said electric powered vehicle is in a state where the vehicular velocity is lower than a negative predetermined value.

11. The control method for an electric powered vehicle according to claim 10, wherein the start of said reverse running further includes a state where said predetermined shift range has been selected and the vehicular velocity of said electric powered vehicle is higher than zero.

12. The control method for an electric powered vehicle according to claim 9, wherein in said step of amplifying, an amplification factor of vehicle driving force at the start of said reverse running relative to the vehicle driving force during said reverse running at the same accelerator opening is set to be variable depending on said accelerator opening while said brake pedal is not being operated.

13. The control method for an electric powered vehicle according to claim 12, wherein in said step of amplifying, said amplification factor is set at a first value when said accelerator opening falls within a first range, and said amplification factor is set to be lower than the first value when said accelerator opening is smaller than said first range and said amplification factor is set to be lower than the first value when said accelerator opening is larger than said first range.

14. The control method for an electric powered vehicle according to claim 9, wherein during said reverse running, said electric powered vehicle is in a state where a vehicular velocity is lower than a predetermined value that is lower than zero, at the start of said reverse running, said vehicular velocity is higher than or equal to zero, and in said step of amplifying, when said vehicular velocity is lower than zero and higher than said predetermined value, said vehicle driving force at the same accelerator opening is amplified to be smaller than the vehicle driving force at the start of said reverse running and larger than the vehicle driving force during said reverse running.

15. The control method for an electric powered vehicle according to claim 9, further comprising the steps of:

calculating a reference angular velocity of said motor based on said accelerator opening and a vehicular velocity of said electric powered vehicle; and when a rotation angular velocity of said motor is lower than said reference angular velocity, setting said vehicle driving force to be larger than when the rotation angular velocity of said motor is higher than said reference angular velocity.

\* \* \* \* \*